United States Patent
Sexton

(10) Patent No.: US 10,209,957 B2
(45) Date of Patent: Feb. 19, 2019

(54) PARTIAL REMAINDER/DIVISOR TABLE SPLIT IMPLEMENTATION

(71) Applicant: Bonnie Sexton, Austin, TX (US)

(72) Inventor: Bonnie Sexton, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 19 days.

(21) Appl. No.: 14/972,077

(22) Filed: Dec. 16, 2015

(65) Prior Publication Data

US 2016/0328207 A1 Nov. 10, 2016

Related U.S. Application Data

(60) Provisional application No. 62/156,804, filed on May 4, 2015.

(51) Int. Cl.
| | |
|---|---|
| G06F 7/46 | (2006.01) |
| G06F 7/537 | (2006.01) |
| G06F 7/552 | (2006.01) |
| G06F 7/72 | (2006.01) |

(52) U.S. Cl.
CPC .............. *G06F 7/463* (2013.01); *G06F 7/537* (2013.01); *G06F 7/5525* (2013.01); *G06F 7/72* (2013.01)

(58) Field of Classification Search
CPC ................................ G06F 7/537; G06F 7/5375
See application file for complete search history.

(56) References Cited

U.S. PATENT DOCUMENTS

| | | | | |
|---|---|---|---|---|
| 5,031,138 A | * | 7/1991 | Maass ..................... | G06F 7/491 708/656 |
| 5,777,917 A | * | 7/1998 | Chung .................... | G06F 7/535 708/653 |
| 6,782,405 B1 | | 8/2004 | Matula et al. | |
| 7,194,499 B2 | | 3/2007 | Jeong et al. | |
| 8,725,786 B2 | | 5/2014 | Powell | |
| 8,819,094 B2 | | 8/2014 | Han et al. | |
| 2011/0231468 A1 | * | 9/2011 | Amin ..................... | G06F 7/5375 708/620 |
| 2012/0066283 A1 | | 3/2012 | Cho et al. | |
| 2013/0173681 A1 | | 7/2013 | Carlough et al. | |

(Continued)

OTHER PUBLICATIONS

Hung, Patrick, et al., "Fast Division Algorithm with a Small Lookup Table," Signals, Systems, and Computers, 1999, Conference Record of the Thirty-Third Asilomar Conference, vol. 2, pp. 1465-1468, ISSN:1058-6393, Print ISBN:0-7803-5700-0, INSPEC Accession No. 6615588 DOI:10.1109/ACSSC.1999.831992,Oct. 27, 1999.

*Primary Examiner* — Chuong D Ngo

(74) *Attorney, Agent, or Firm* — Renaissance IP Law Group LLP

(57) ABSTRACT

According to one general aspect, an apparatus may include a key selector configured to select a personality key from at least a portion of an input value. The apparatus may include a sparse look-up table configured to determine a portion of a result based upon the personality key and a prior remainder. The apparatus may include an adder configured to compute a current remainder based upon, at least, the input value, and the portion of the result. The apparatus may be configured to iteratively compute current remainders and portions of the result until either the current remainder is zero, or a predefined level of precision is reached.

9 Claims, 10 Drawing Sheets

(56) References Cited

U.S. PATENT DOCUMENTS

2013/0173683 A1* 7/2013 Carlough .............. G06F 7/5375
708/650
2016/0313976 A1* 10/2016 Dibrino ..................... G06F 7/52

* cited by examiner

Divisor /Root 5432.10  0000 0001 0010 0011 0100 0101 0110 0111 1000 1001 1010 1011 1100 1101 1110 1111

Out of Range

+2

+1

+0

-0

-1

-2

Out of Range

```
casez(row[ 4: 0])
642  5'b000_0?: {Qbit[1:0]} = {2'b00};                                  //-----Positive-----      //-----Negative
                                                                        ------+0.00  <-----------This now has no match at all!
                                                                        ------+0.25                ------ -0.25  ------ 5'b111_1?: {Qbit[1:0]} = {2'b00};
     5'b000_10: {Qbit[1:0]} = {{1'b0,pKey[10]}};  ------+0.50 pKey[10]   ------ -0.50
     5'b000_11,                                   ------+0.75            ------ -0.75  ------ 5'b111_01: {Qbit[1:0]} = {1'b0,pKey[10]};
     5'b001_0?: {Qbit[1:0]} = {2'b10};            ------+1.00            ------ -1.00          5'b111_00,
                                                  ------+1.25  ┌646     ------ -1.25  ------ 5'b110_1?: {Qbit[1:0]} = {2'b10};
                                                  ------+1.50 pKey[ 9: 8]  ---- -1.50
     5'b001_10: {Qbit[1:0]} = {pKey[ 9: 8]};      ------+1.75 pKey[ 7: 6]  ---- -1.75  ------ 5'b110_01: {Qbit[1:0]} = {pKey[ 9: 8]}; ┐648
     5'b001_11: {Qbit[1:0]} = {pKey[ 7: 6]};      ------+2.00 pKey[ 5: 4]  ---- -2.00  ------ 5'b110_00: {Qbit[1:0]} = {pKey[ 7: 6]};
     5'b010_00: {Qbit[1:0]} = {pKey[ 5: 4]};      ------+2.25 pKey[ 3: 2]  ---- -2.25  ------ 5'b101_11: {Qbit[1:0]} = {pKey[ 5: 4]};
     5'b010_01: {Qbit[1:0]} = {pKey[ 3: 2]};      ------+2.50 pKey[ 1: 0]  ---- -2.50  ------ 5'b101_10: {Qbit[1:0]} = {pKey[ 3: 2]};
     5'b010_10: {Qbit[1:0]} = {pKey[ 1: 0]};      ------+2.75            ------ -2.75  ------ 5'b101_01: {Qbit[1:0]} = {pKey[ 1: 0]};
     5'b010_11,                                   ------+3.00            ------ -3.00          5'b101_00,
     5'b011_??: {Qbit[1:0]} = {2'b01};            ------+3.25            ------ -3.25  ------ 5'b100_??: {Qbit[1:0]} = {2'b01};
                                                  ------+3.50            ------ -3.50
                                                  ------+3.75            ------ -3.75
     5'b100_??: {Qbit[1:0]} = {2'b01};            ------+4.00            ------ -4.00
                                                  ------+4.25            ------ -4.25  ------ 5'b011_??: {Qbit[1:0]} = {2'b01};
                                                  ------+4.50            ------ -4.50
                                                  ------+4.75            ------ -4.75
     5'b101_0?: {Qbit[1:0]} = {2'b01};            ------+5.00            ------ -5.00
                                                  ------+5.25            ------ -5.25  ------ 5'b010_1?: {Qbit[1:0]} = {2'b01};
                                                       644  ------ -5.50 <-----------This also has no match!
```

FIG. 6c
652

```
casez(row[ 4: 0]}
    5'b000_0?: {Qbit[1:0]} = {2'b00};                           //-----Non-Negative-----      //-----Negative-----
                                                                ----- +0.00                   -0.25 -----
                                                                ----- +0.25                   -0.50 -----
    5'b000_10: {Qbit[1:0]} = {{1'b0,pKey[10]}};                 ----- +0.50 pKey[10]          -0.75 ----- 5'b111_01: {Qbit[1:0]} = {1'b0,pKey[10]};
    5'b000_11,                                                  ----- +0.75                   -1.00 ----- 5'b111_00,
    5'b001_0?: {Qbit[1:0]} = {2'b10};                           ----- +1.00                   -1.25 ----- 5'b110_1?: {Qbit[1:0]} = {2'b10};
                                                                ----- +1.25                   -1.50 -----
    5'b001_10: {Qbit[1:0]} = {pKey[ 9: 8]};                     ----- +1.50 pKey[ 9: 8]       -1.75 ----- 5'b110_01: {Qbit[1:0]} = {pKey[ 9: 8]};
    5'b001_11: {Qbit[1:0]} = {pKey[ 7: 6]};                     ----- +1.75 pKey[ 7: 6]       -2.00 ----- 5'b110_00: {Qbit[1:0]} = {pKey[ 7: 6]};  668
    5'b010_00: {Qbit[1:0]} = {pKey[ 5: 4]};    <                ----- +2.00 pKey[ 5: 4]       -2.25 ----- 5'b101_11: {Qbit[1:0]} = {pKey[ 5: 4]};
    5'b010_01: {Qbit[1:0]} = {pKey[ 3: 2]};                     ----- +2.25 pKey[ 3: 2]       -2.50 ----- 5'b101_10: {Qbit[1:0]} = {pKey[ 3: 2]};
    5'b010_10: {Qbit[1:0]} = {pKey[ 1: 0]};                     ----- +2.50 pKey[ 1: 0]       -2.75 ----- 5'b101_01: {Qbit[1:0]} = {pKey[ 1: 0]};
    5'b010_11,                                                  ----- +2.75                   -3.00 ----- 5'b101_00,
    5'b011_??: {Qbit[1:0]} = {2'b01};                           ----- +3.00                   -3.25 ----- 5'b100_??: {Qbit[1:0]} = {2'b01};
                                                                ----- +3.25                   -3.50 -----
                                                                ----- +3.50                   -3.75 -----
                                                                ----- +3.75                   -4.00 -----
    5'b100_??: {Qbit[1:0]} = {2'b01};                           ----- +4.00                   -4.25 ----- 5'b011_??: {Qbit[1:0]} = {2'b01};
                                                                ----- +4.25                   -4.50 -----
                                                                ----- +4.50                   -4.75 -----
                                                                ----- +4.75                   -5.00 -----
    5'b101_0?: {Qbit[1:0]} = {2'b01};                           ----- +5.00                   -5.25 ----- 5'b010_1?: {Qbit[1:0]} = {2'b01};
                                                                ----- +5.25                   -5.50 -----
```

666

<--Qbit 00 = Qbit 00 etc....

700

PARTIAL REMAINDER/DIVISOR TABLE SPLIT IMPLEMENTATION

CROSS-REFERENCE TO RELATED APPLICATION

This application claims priority under 35 U.S.C. § 119 to Provisional Patent Application Ser. No. 62/156,804, entitled "PARTIAL REMAINDER/DIVISOR TABLE SPLIT IMPLEMENTATION" filed on May 4, 2015. The subject matter of this earlier filed application is hereby incorporated by reference.

TECHNICAL FIELD

This description relates to a circuit for performing mathematics, and more specifically to a circuit for performing division.

BACKGROUND

Division is a mathematical operation by which, given two numbers, their quotient and/or remainder are computed. As a remainder of terms, the generally larger number being divided is referred to as numerator or dividend (N). The number by which the dividend is being divided by is referred to as the denominator or divisor (D). The whole number result is referred to as the quotient (Q) and any number left over after the quotient has been determined is the remainder (R). Or stated in a more familiar equation:

$N/D=(Q,R)$, or $N=(Q*D)+R$

As one will remember from their school days, division tends to be an iterative process. One guesses, for each decimal place in the dividend, how many times the divisor will go into the dividend (up to the current decimal place). One then subtracts that guessed multiplied divisor (Q*D) from the dividend (N) and gets a partial or current remainder (PR). One then moves the active decimal point and performs the process again for the current remainder prepended to the next decimal of the dividend. This continues until a final quotient and remainder (if any) are determined.

Perhaps surprisingly, computers perform the same basic set of operations when doing division. The main difference being that, as computers don't use a base-10 or decimal number system, the "decimal point" is referred to by its more general term, "radix point". The larger a radix that can be used, the less iterations the computer may have to go through and the faster the overall division operation.

Division techniques generally fall into two main categories: slow division and fast division. Slow division algorithms produce one digit of the final quotient per iteration. Examples of slow division include restoring, non-performing restoring, non-restoring, and SRT division. Fast division methods start with a close approximation to the final quotient and produce twice as many digits of the final quotient on each iteration. Newton-Raphson and Goldschmidt techniques fall into this category.

Named for its creators (Sweeney, Robertson, and Tocher), SRT division is a popular method for division in many microprocessor implementations. SRT division is similar to non-restoring division, but it uses a lookup table based on the dividend and the divisor to determine each quotient digit. The Intel Pentium processor's infamous floating-point division bug was caused by an incorrectly coded lookup table. Five of the 1066 entries had been mistakenly omitted.

One of the problems of SRT-like division is that the look-up tables (LUTs) can be very large. Exacerbating this problem is the fact that as a radix increases (e.g., from 2 to 4, or even to 16, 32, 64, or 128, etc.) the size of the look-up table increases greatly. Generally, as the size of the look-up table increases not only does the size of the circuit needed to store the LUT increase, but the time needed for the circuit to process the LUT increases.

SUMMARY

According to one general aspect, an apparatus may include a key selector configured to select a personality key from at least a portion of an input value. The apparatus may include a sparse look-up table configured to determine a portion of a result based upon the personality key and a prior remainder. The apparatus may include an adder configured to compute a current remainder based upon, at least, the input value, and the portion of the result. The apparatus may be configured to iteratively compute current remainders and portions of the result until either the current remainder is zero, or a predefined level of precision is reached.

According to another general aspect, a method may include selecting a personality key based upon at least a portion of a divisor. The method may include determining a portion of a quotient from a sparse look-up table and based upon the personality key and a prior remainder. The method may include computing a current remainder based upon a dividend, the divisor, and the portion of the quotient. The method may include iteratively performing the steps of determining a portion of a quotient and computing a current remainder until either the current remainder is zero, or a predefined level of precision is reached.

According to another general aspect, a system-on-a-chip (SoC) may include an instruction unit configured to issue an instruction to an arithmetic unit, wherein the instruction is associated with an input value. The arithmetic unit may include a key selector configured to select a personality key from at least a portion of the input value. The arithmetic unit may include a sparse look-up table configured to determine a portion of a result based upon the personality key and a prior remainder. The arithmetic unit may include an adder configured to compute a current remainder based upon the input value, and the portion of the result. The arithmetic unit may be configured to iteratively compute current remainders and portions of the result until either the current remainder is zero, or a predefined level of precision is reached. The SoC may include a memory configured to store the result.

The details of one or more implementations are set forth in the accompanying drawings and the description below. Other features will be apparent from the description and drawings, and from the claims.

A system and/or method for a circuit for performing mathematics, and more specifically to a circuit for performing division, substantially as shown in and/or described in connection with at least one of the figures, as set forth more completely in the claims.

BRIEF DESCRIPTION OF THE DRAWINGS

FIG. 3 is a diagram of an example embodiment of a data structure in accordance with the disclosed subject matter.

FIG. 6b is a diagram of an example embodiment of a data structure in accordance with the disclosed subject matter.

FIG. 6c is a diagram of an example embodiment of a data structure in accordance with the disclosed subject matter.

Like reference symbols in the various drawings indicate like elements.

DETAILED DESCRIPTION

Figure 1:
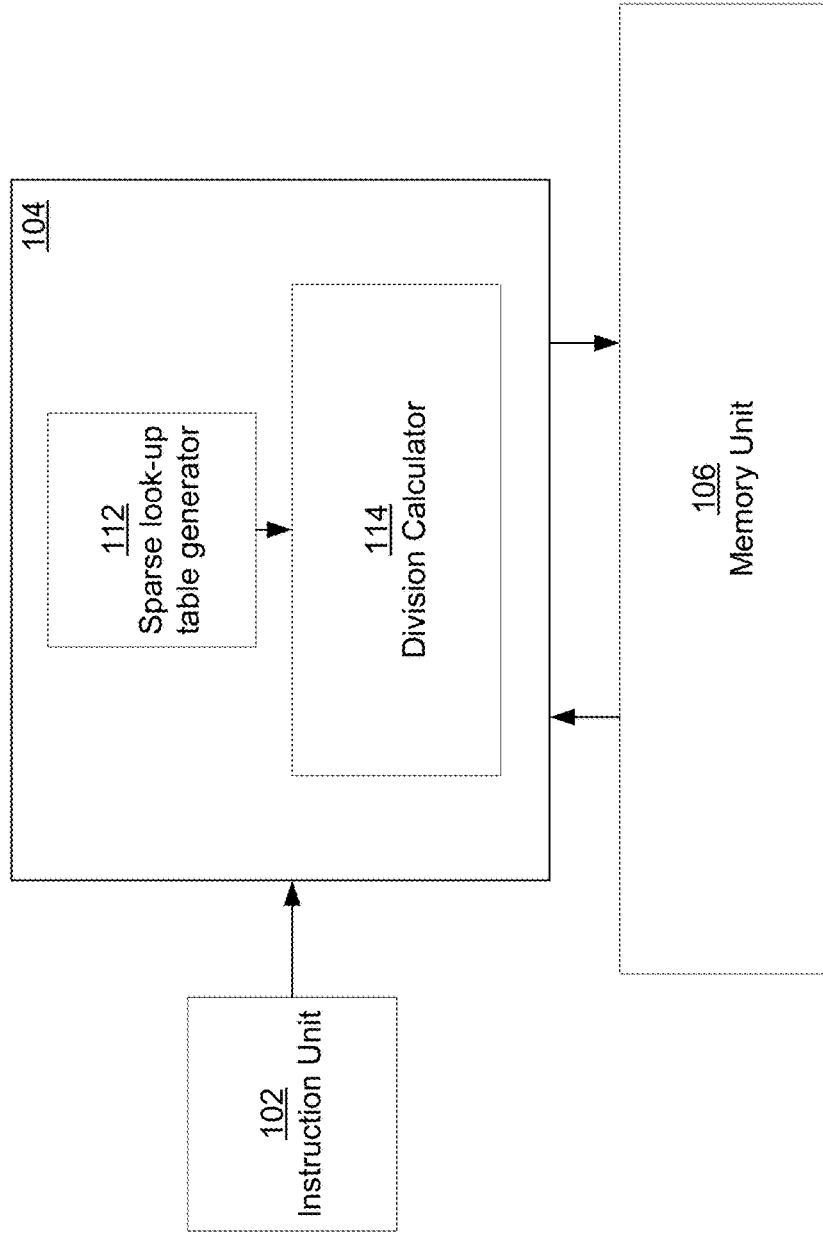
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may include a processor or even a system-on-a-chip (SoC). It is understood that the above are merely a few illustrative examples to which the disclosed subject matter is not limited.

In the illustrated embodiment, the system 100 may include an instruction unit 102 that issues instructions to various execution units (only one shown). In the illustrated embodiment, the instruction unit 102 may receive an instruction to perform some form of division (e.g., integer division, floating-point division, a square root operation, etc.). The instruction unit 102 may issue or forward this instruction to an arithmetic execution unit 104.

In the illustrated embodiment, the system 100 may include one or more arithmetic execution units 104. In some embodiments, this arithmetic unit 104 may process integer mathematical operations. In another embodiment, this arithmetic unit 104 may process floating-point mathematical operations. It is understood that the above are merely a few illustrative examples to which the disclosed subject matter is not limited. In the illustrated embodiment, the arithmetic unit 104 may be configured to perform division operations (e.g., square root operations, division operations, etc.).

In various embodiments, the system 100 may include a memory unit 106. In various embodiments, this memory unit 106 may include registers, a cache, or a more long term memory. In such an embodiment, the memory 106 may be configured to store data, such as the inputs of the instruction and/or the outputs or results of the instruction. In various embodiments, the instruction may be associated with a divisor and dividend. In the illustrated embodiment, the inputs may be provided to the arithmetic unit 104 via the memory 106. In another embodiment, the inputs may be provided by the instruction unit 102.

In the illustrated embodiment, the arithmetic execution unit 104 may be configured to perform the mathematic instruction or operation via a technique that employs a look-up table (LUT). However, as described below, the arithmetic unit 104 may employ a sparse look-up table that is generated using a personality key or a signature of the dividend.

In such an embodiment, the arithmetic unit 104 may include a sparse LUT generator circuit 112 configured to generate a sparse LUT based upon the personality key and a full LUT. As this sparse LUT may be used for each interaction of the division operation, pairing the full LUT down to a more efficient, sparser version may reap significant benefits. In some embodiments, the sparse LUT may even be folded over or in half, taking advantage of symmetries in the full LUT to reduce the size of the LUT by at least 50%.

In the illustrated embodiment, the sparse LUT generator circuit 112 may provide the sparse LUT to the division calculator circuit 114. The division calculator circuit 114 may then iteratively employ the sparse LUT to determine the results of the division operation. In such an embodiment, the results may include a quotient and a remainder. These results may then be stored in the memory 106.

In this document for purposes of clarity of example, embodiments that process division instructions will be described, for example, in FIG. 2, etc. However, it is understood that the division is merely a one illustrative examples to which the disclosed subject matter is not limited.

In various embodiments, the disclosed subject matter may be employed to compute square root values. In division embodiments, a first input value may be the divisor and a second input may be the dividend. The result may be the quotient. In a square root embodiment, a first input value may be the radicand and the result may be the root. In some embodiments, an $n^{th}$ root embodiment may exist in which a second input value is the degree (e.g., in a square root embodiment the degree may be equal to 2, in a cube root embodiment the degree may be equal to 3, etc.). One skilled in the art will understand how a square root embodiment may be created based upon the disclosed subject matter and known square root computation techniques. It is understood that the above are merely a few illustrative examples to which the disclosed subject matter is not limited.

Figure 2:
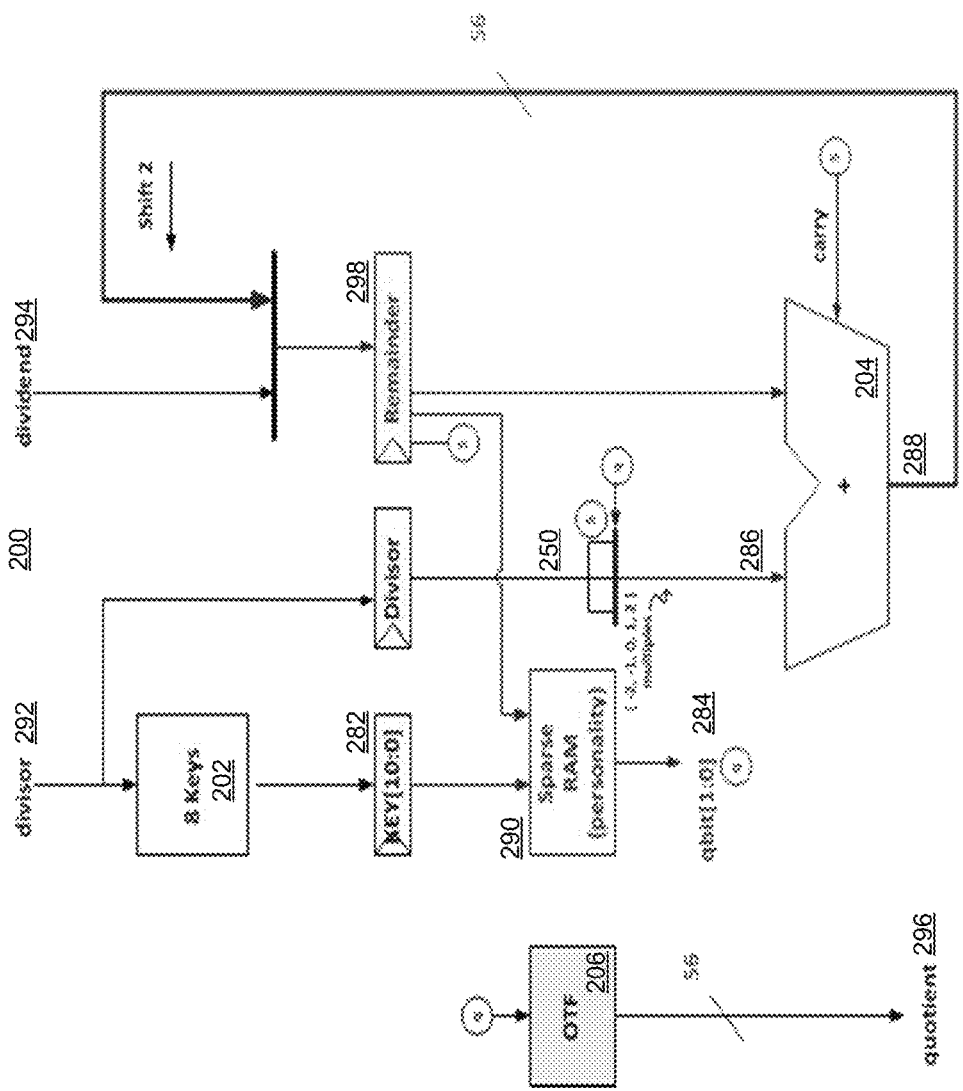
FIG. 2 is a block diagram of an example embodiment of a system in accordance with the disclosed subject matter.

FIG. 2 is a block diagram of an example embodiment of a system 200 in accordance with the disclosed subject matter. In various embodiments, the system 200 may include a circuit configured to perform the mathematical operation of division, given a divisor 292 and dividend 294 as inputs. In various embodiments, the results of the division operation may include a quotient 296 and a remainder 298.

In the illustrated embodiment, the division operation is shown using a radix of 4. In various embodiments, the radix may change, and in some embodiments, may be dynamically altered based upon the received instruction. In various embodiments, radixes of 2, 4, 8, 16, and even 32, 64, or 128 are contemplated. Traditionally, in circuits involving higher radixes (e.g., 16 or greater), the size of the LUT and associated logic circuits may become prohibitive. However, in the illustrated embodiment, the use of a sparse LUT, specifically one associated with a personality key may reduce the size and associated circuitry to manageable portions. It is understood that the above are merely a few illustrative examples to which the disclosed subject matter is not limited.

In the illustrated embodiment, the system 200 may include a key table or selector 202 configured to select a personality key 282 that is associated with the divisor 292. For each radix size (e.g., 4, 8, 16, etc.) the size of the personality key 282 and the number of possible personality keys may differ. In the illustrated embodiment, there may be eight possible keys 282 of 11-bits each. In such an embodiment, the three most significant bits (MSBs) of the divisor 292 (or more generally a portion of the divisor 292) may be employed to select one of eight possible personality keys. This key 282 dictates how quotients or more specifically qbits 284 are to be selected or guessed during each iteration of the division process. Similarly to the same way one would use different times tables (based on the divisor) for guessing quotients when manually performing decimal long divisions, the personality key 282 allows the system 200 to vary the look-up table based upon the divisor 292.

In various embodiments, the system 200 may include a sparse memory (e.g., a random access memory (RAM), a multiplexer and flip-flops, etc.) to store a sparse LUT 290. In the illustrated embodiment, the sparse LUT 290 may have already been provided by the sparse LUT generator. The generation of the sparse LUT 290 will be described below in reference to FIGS. 3, 4, 5, 6a, 6b, 6c, and 7.

In various embodiments, the sparse LUT 290 may include a one dimensional table having a number of entries indexed by the value of the previous iteration's remainder 298 (or a portion thereof). In some embodiments, some of these entries may be constants (e.g., 0b10, 0b11, etc.) or may be variable and dependent upon the personality key 282 (e.g., key[5:4], key[1:0], 0b0 & key [10], etc.). In such an embodiment, the sparse LUT 290 may be static for the performance of a given division operation, as the key 282 once chosen (based on the input divisor) will not change.

In such an embodiment, the sparse LUT 290 may include one column and a number of rows. The index to each row may be a portion of the previous iteration's remainder 298. In one embodiment, the larger more generalized LUT employed for division may be split into smaller sub-LUTs for each column, as described below. It was further discovered that since the column of the larger LUT is set at the beginning of the division operation, only one sub-LUT needed to be used during the operation's iterations. While the fact that the column is set at the beginning of the operation was previously known, but how to exploit this has not be successfully done to the extent shown by the disclosed subject matter.

In such an embodiment, a key was developed to represent each of the sub-LUTs. This key is shown as personality key 282. Each personality key 282 allows for a reduction by column and then by row to get the smallest possible key. The key 282 may be passed along to the sub-LUT 290 and enable the sparse LUT 290 to behave as though it was the full LUT.

Splitting the LUT has the advantage of reducing the size of the LUT 290 and the sparse LUT 290 may be reduced from 704 2-bit entries (16 by 44) to 22 entries. Each entry may include 2 bits for the Qbit.

Further, as some neighboring rows may include the same entry value, the sparse LUT 290 may include collapsed rows such that for multiple inputs or remainder 298 values the same entry or row is selected.

In a traditional radix 4 implementation, a full partial remainder LUT may include 704 2-bit entries. In the illustrated embodiment, a folded sparse LUT 290 for a radix 4 implementation may include 10 2-bit entries. It is understood that the above is merely one illustrative example to which the disclosed subject matter is not limited.

In another embodiment, the sparse LUT 290 may not only be reduced in size (e.g., via a column and row elimination, etc.) but may also be folded. In such an embodiment, the sparse LUT 209 may include a folded LUT. That is the LUT 290 may be roughly symmetrical for both positive and negative rows. In various embodiments, the symmetry may exist not for positive and negative rows but for non-negative (both positive and zero) and negative rows. This will be discussed in more detail below. In such an embodiment, if the remainder 298 is negative the remainder 298 (or the portion employed as an index) may be inverted before using the value as an index. In such an embodiment, a folded sparse LUT 290 may not only take up less space, but with the use of invertors require less logic (as compared to a multiplexer that handles both positive and negative values).

During the implementation of this split LUT embodiment the table became much smaller and easier to analyze. It was this reduction in size that enabled one to see a second idea: the table fold. This folding idea has been talked about and tried for years, but had never been gotten right. Prior attempts at a folded table required extra logic to make up for the fact that the positive and negative halves don't fold upon each other cleanly. However, once the LUT was reduced to the point that it was easier to analyze the adjustments needed to fold the table where seen. After folding the LUT (as described below) the final size of the folded LUT is now just 11 rows of 2-bit values. This is really tiny compared to 704 entries of the full LUT. In such an embodiment, the advantages of timing, logic, and power consumption can been seen.

The output of the sparse LUT 282 may be a portion of the quotient 296, referred to as qbits (q) 284. In various embodiments, as the size of the radix changes, the size or number of the qbits 284 may change. In some embodiments, the qbits 284 may be a guess as to the number of times divisor 292 will go into the current portion of the dividend 294. In the illustrated embodiment, five possible qbit 284 values may be chosen from the sparse LUT 290: −2, −1, 0, 1, and 2. It is understood that the above is merely one illustrative example to which the disclosed subject matter is not limited.

The divisor 292 may then be multiplied by the qbits 284 (illustrated at point 250). In the illustrated embodiment, a non-restoring division technique is employed. In such an embodiment, the sign (s) of previous remainder 298 may be employed to adjust the sign of the multiplied divisor 286 (Q*D).

In various embodiments, the system 200 may include an adder 204. The adder 204 may add the multiplied divisor 286 to the previous remainder 298. In some embodiments, the adder 204 may include a full adder 204 (as opposed to a carry save adder (CSA)). In such an embodiment, a carry-look-ahead adder for the partial remainder row selection may not be necessary. Further, the full adder may yield a more precise value allowing the system to use less (e.g., 6 bits, etc.) of the remainder 298 for row lookup. Another advantage of the full adder is that the CSA choice requires two sets of registers to maintain carry and sum information for each iteration, whereas the full adder does not. For double precision this is a large area cost with twice the number of flip flops, and may be avoided by the use of a full adder. In the illustrated embodiment, the sign bit may be employed as the carry input to the adder 204. It is understood that the above is merely one illustrative example to which the disclosed subject matter is not limited.

In the illustrated embodiment, the adder's output 288 may be combined with the dividend 294 to generate the new or current remainder 298. This new or current remainder 298 may become the previous remainder 298 in the next iteration. In various embodiments, combining may include shifting the adder's output 288 a number of bits, as determined by the radix size (e.g., 2-bits for a radix 4 implementation). It is understood that by increasing the radix size, and hence the number of bits shifted or processed by each iteration, the number of iterations may be reduced and the time taken to perform the overall division operation reduced.

The system 200 may process multiple iterations until the remainder 298 is zero or a predetermined or predefined level of precision has been achieved. In the illustrated embodiment, the system 200 may include a quotient accumulator 206 configured to receive the qbits 284 from each iteration and produce a full quotient 296. After the last iteration, the quotient 296 and final remainder 298 (if any) may be output by the system 200 (e.g., to a memory, etc.).

FIG. 3 is a diagram of an example embodiment of a data structure 300 in accordance with the disclosed subject matter. In various embodiments, the data structure 300 may include a full partial remainder/divisor look up table for a radix 4 implementation. In the illustrated embodiment, the LUT may include 16 columns and 44 rows, totaling 704 entries. It is understood that the above is merely one illustrative example to which the disclosed subject matter is not limited.

In the illustrated embodiment, the columns are determined or indexed by the four MSBs of the divisor. As such, as the divisor remains constant for each division operation, the selected column will remain the same throughout the division operation. Conversely, the rows are determined by the six MSBs of the partial or previous remainder. As the partial or previous remainder will change every iteration of the division operation, the selected row is expected to change each iteration of the division operation.

In the illustrated embodiment, three general types of entries or cell values are shown. Entries with a value of "Out of Range" are considered "don't care" values, meaning that their values are immaterial. Generally these represent remainder values that are not possible for a given divisor (e.g., a divisor of 3 cannot have a remainder of 7). Entries with a fixed value (e.g., ±2 or 10, ±1 or 01, ±0 or 00, etc.) are constants and do not change regardless of the divisor. Entries marked with one or two asterisks ("*") change based upon the divisor and may be represented by a given divisor's personality key. Each entry represents a binary value, or (when translated into decimal notation) an entry in the quotient set, {0, 1, 2}. In various embodiments, a sign bit of the partial or previous remainder may be included to form a redundant quotient set, {−2, −1, 0, +1, +2}. It is understood that the above is merely one illustrative example to which the disclosed subject matter is not limited.

Further, in the illustrated embodiment, there are six boxed or highlighted entries. It is noted that these entries are not symmetrical (about the center line between row 0000.00 and row 1111.11) and therefore present a problem for table folding operations.

Figure 4:
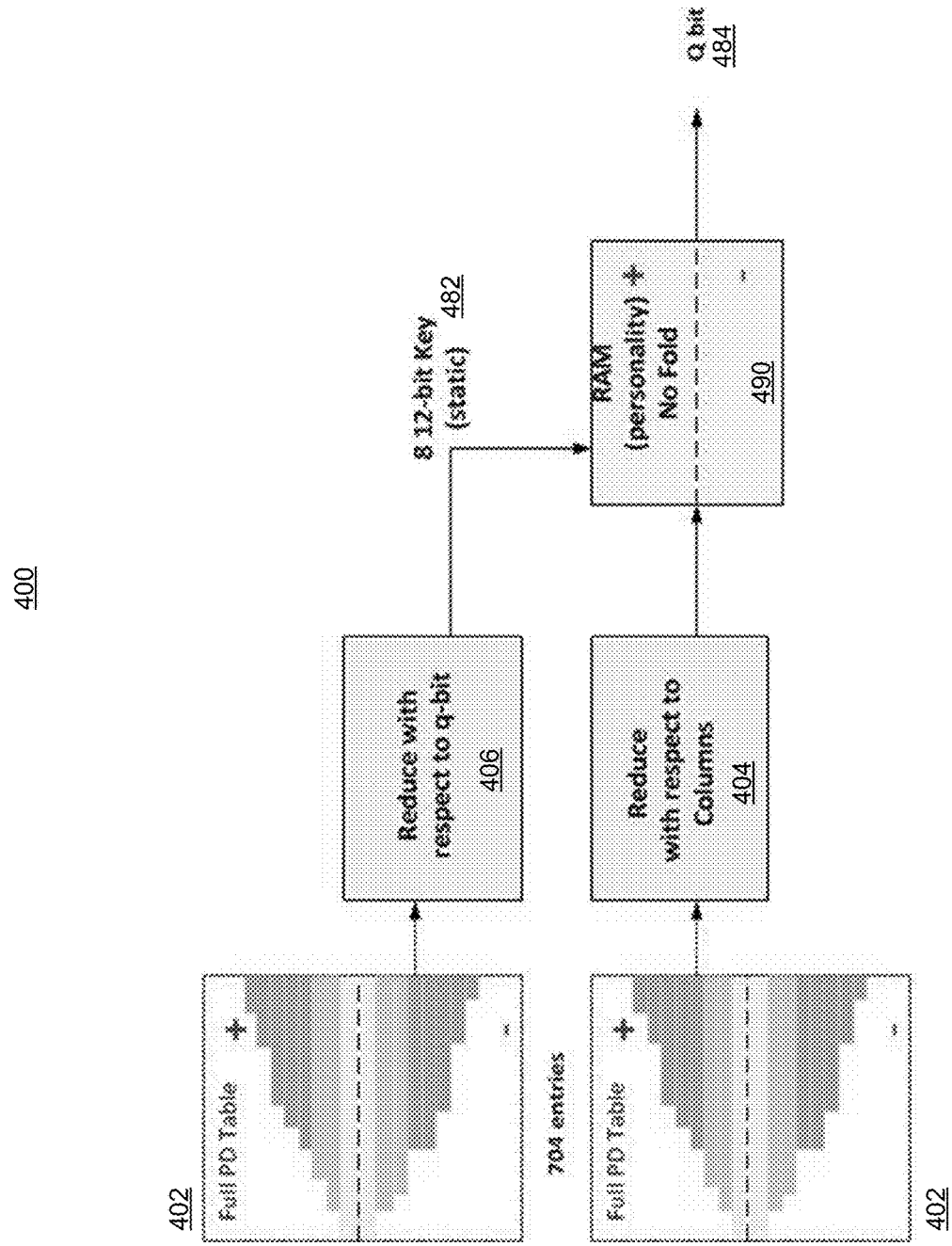
FIG. 4 is a block diagram of an example embodiment of a system in accordance with the disclosed subject matter.

FIG. 4 is a block diagram of an example embodiment of a system 400 in accordance with the disclosed subject matter. In various embodiments, the system 400 may include an embodiment of a sparse LUT generator, as shown in FIG. 1. In various embodiments, the sparse LUT generator 400 may be configured to generate a sparse LUT for each division operation or instruction based upon the input divisor.

In the illustrated embodiment, the sparse LUT generator 400 may include a full partial remainder/divisor (PD) table 402, such as that shown in FIG. 3. In such an embodiment, the PD table 402 may include a series of columns for each divisor and a series of rows for each partial remainder (both positive and negative).

In the illustrated embodiment, the sparse LUT generator 400 may include a column selector circuit 404 configured to select the column that will be accessed for the current division operation based upon the given divisor. In such an embodiment, this may reduce the LUT from many columns (e.g., 16 columns for radix 4) to a single column. Already a reduction of 16:1 or greater has occurred.

In the illustrated embodiment, the sparse LUT generator 400 may include a row compressor circuit 406. In such an embodiment, rows with neighbors having similar entry values may be reduced to a common or collapsed row. For example, referring back to FIG. 3, all of the entries for the rows 1100.00, 1100.01, 1100.10, and 1100.11 have values of either 0b01 or X (don't care). As X may be any value that is convenient, in this case X may take on the value 0b01. Therefore, all rows starting with 1100 (1100.XX) may be considered to have a value of 0b01. These four rows may be collapsed into a single row having an index of 1100.XX and an entry of 0b01. In the case of these four rows a compression of 4:1 may be achieved. Likewise for other rows.

While the illustrated embodiment shows the column selection (404) and row compression (406) happening in parallel, in various embodiments, they may occur in series. In such an embodiment, the row compression (406) may occur after the column selection (404). That way any non-similar rows entries may be removed by the column selection allowing a greater row compression. It is understood that the above is merely one illustrative example to which the disclosed subject matter is not limited.

In some embodiments, the outputs of the column selector circuit 404 and the row compressor circuit 406 may be combined to form the sparse LUT 490. As described above in reference to FIG. 2, the sparse LUT 490 may be employed, during each iteration, to generate or output one or more qbits 484.

In one embodiment, shown in FIG. 2, the sparse LUT 490 may include entries that refer directly to various portions of the personality key 482 (e.g., key[5:4], key[1:0], etc.) and these values may be "filled in" during each iteration as the sparse LUT 490 is accessed. In such an embodiment, a register storing the key 482 may be an input to the spare LUT 490 logic. Conversely, in the illustrated embodiment of FIG. 4, since the personality key 482 is static during the entirety of a division operation or instruction, the values of the sparse LUT 490 that refer to the key 482 may be statically embedded into the sparse LUT 490. For example, if the entry refers to key[5:4] and key[5:4] has a value of 0b11, the entry's value may be changed to 0b11. Therefore, the sparse LUT 490 may become an array of constants (for that particular division operation). In such an embodiment, the system shown in FIG. 2 may change appropriately. It is understood that the above is merely one illustrative example to which the disclosed subject matter is not limited.

Figure 5:
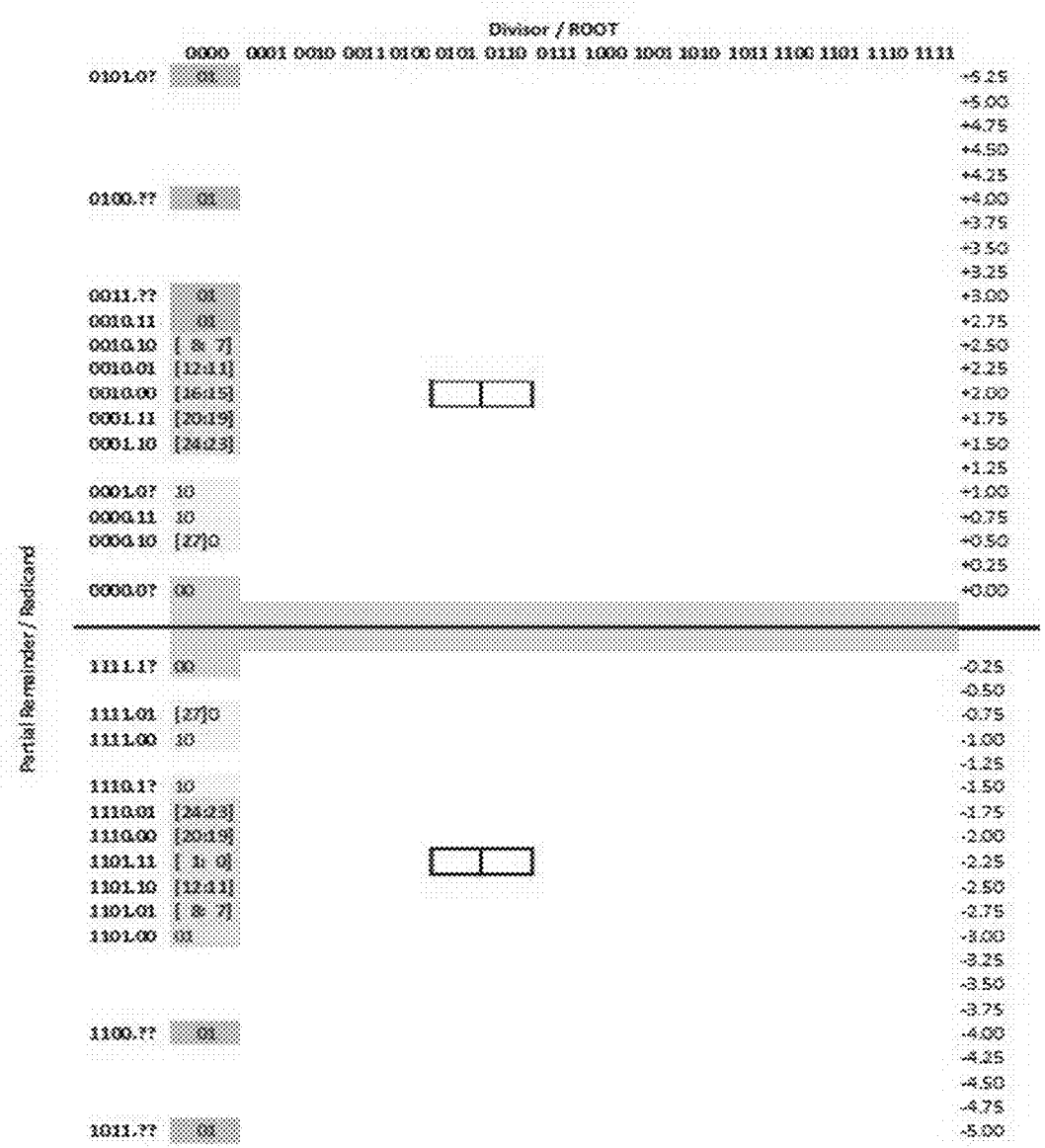
FIG. 5 is a diagram of an example embodiment of a data structure in accordance with the disclosed subject matter.

FIG. 5 is a diagram of an example embodiment of a data structure 500 in accordance with the disclosed subject matter. In various embodiments, the data structure 500 may include an un-folded sparse partial remainder/divisor look up table for a radix 4 implementation. In the illustrated embodiment, the LUT may have been reduced to 1 column and 25 rows, totaling 25 entries, or a reduction of nearly 28:1. It is understood that the above is merely one illustrative example to which the disclosed subject matter is not limited.

In the illustrated embodiment, only column 0000 has remained. This provides a 16:1 reduction in LUT size. Then various like rows have been collapsed. For example, the rows 1111.11 and 1111.10 have been collapsed into a common row 1111.1? (where "?" signifies a 1-bit don't care). This has resulted in further reductions in the size of the LUT.

In the illustrated embodiment, various rows (e.g., 0010.11, 1111.00, etc.) include constant or static entry values (e.g., 0b01, ob10, respectively). Other entry values may be dynamic or dependent upon the personality key. For example, row 0001.10's entry includes the $24^{th}$ and $23^{rd}$ bits of the personality key. Row 1111.01's entry includes the $27^{th}$ bit of the key concatenated with the constant value 0b0. Because similar rows have been collapsed, the sparse LUT 500 no longer includes any "X" or "Don't care" entries. For example, the previously "Don't care" entry for row 0010.11 has been converted to the constant 0b01. It is understood that the above are merely a few illustrative examples to which the disclosed subject matter is not limited.

While an unfolded sparse LUT 500 is illustrated in FIG. 5, one can see that the table is symmetrical along the center line (between 0000.0? and 1111.1?). Thus, in various embodiments, the sparse LUT 500 may be folded in half, reducing the rows to 13. In order to do this the LUT 500 may not be folded between strictly positive and negative values. Instead the center line is shifted or offset by a fixed amount (e.g., −0.25 or 0b0.01). When shifted the negative and non-negative (positive or zero) rows may become symmetrical and may be folded.

Further, one may note that the row indexes or MSBs of the partial remainders between the negative and non-negative values are merely inverses of each other. Therefore, in one embodiment, a simple invertor may be applied to negative remainder values before such a value is input into the folded sparse LUT 500. In such an embodiment, the folded sparse LUT 500 may be implemented as a multiplexer and the folding and inversion may significantly reduce the amount of logic needed to implement the folded sparse LUT look-up function.

Figure 6A:
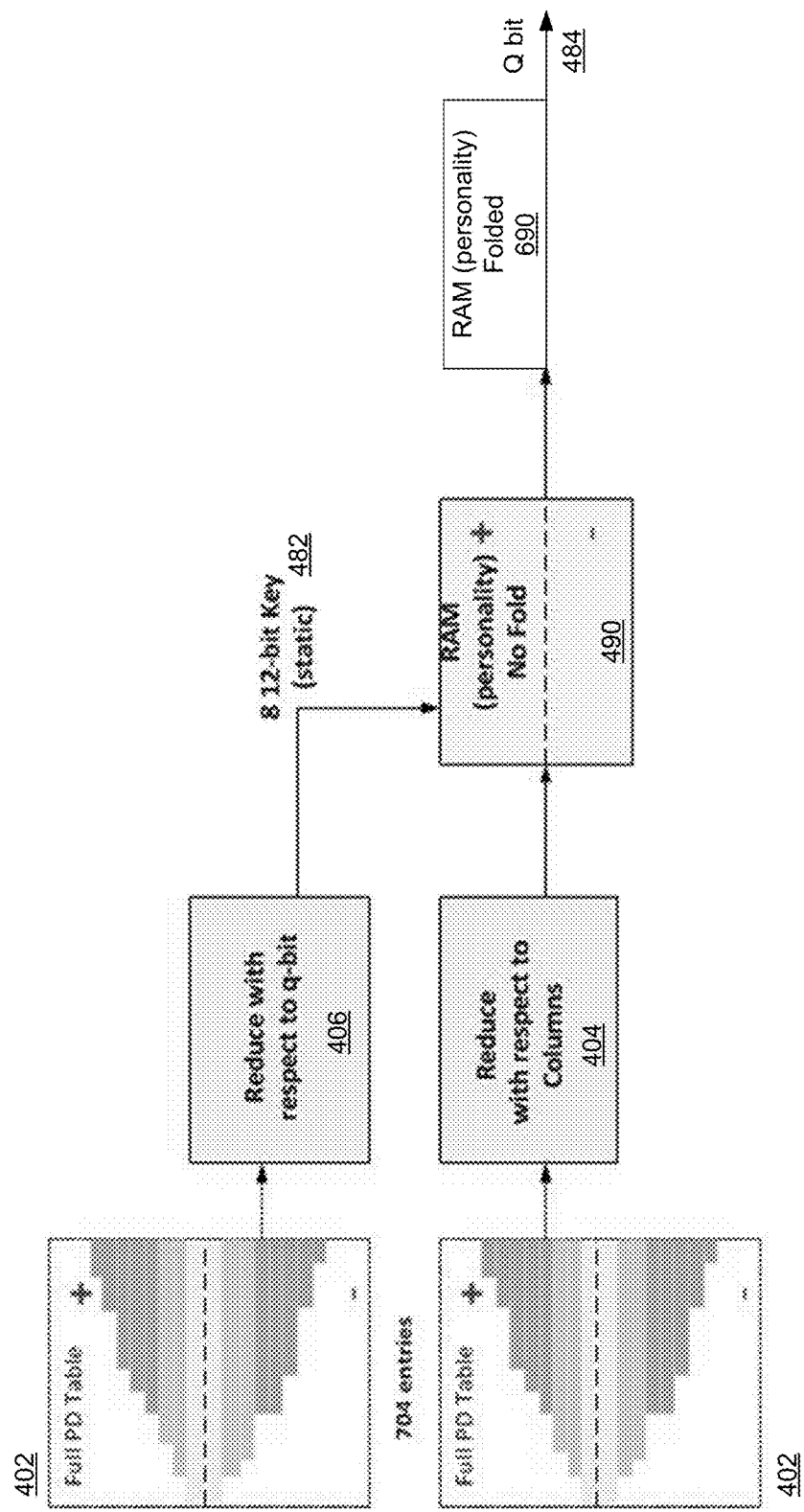
FIG. 6a is a block diagram of an example embodiment of a system in accordance with the disclosed subject matter.

FIG. 6a is a block diagram of an example embodiment of a system 600 in accordance with the disclosed subject matter. In various embodiments, the system 600 may include an embodiment of a sparse LUT generator, as shown in FIG. 1. In various embodiments, the sparse LUT generator 600 may be configured to generate a sparse LUT for each division operation or instruction based upon the input divisor.

In the illustrated embodiment, the sparse LUT generator 600 may include a full partial remainder/divisor (PD) table 402 and a column selector circuit 404. In such an embodiment, the sparse LUT generator 400 may include a row compressor circuit 406. In some embodiments, the outputs of the column selector circuit 404 and the row compressor circuit 406 may be combined to form the sparse LUT 490, as described above.

In the illustrated embodiment, the spare LUT 490 may be folded to form the folded spare LUT 690. In such an embodiment, the size of the LUT may be reduced, again, by a factor of 50%. In various embodiments, the unfolder sparse LUT 490 may be folded along a center line that divides negative and non-negative (i.e., positives and zero values). The final size of the folded LUT 690 may now be just 11 rows of 2-bit values. In such an embodiment, the folded LUT 690 may tiny compared to 704 entries of the Full PD table 402.

FIG. 6b is a block diagram of an example embodiment of a data structure or table 651 in accordance with the disclosed subject matter. In various embodiments, the table 651 may include an embodiment of a sparse LUT, as shown in FIG. 5. In various embodiments, the sparse LUT 651 may be generated for each division or square root operation or instruction.

In the illustrated embodiment, the sparse LUT 651 may include positive and negative rows or values. As can be seen, the positive and negative rows are not symmetrical, and preclude easy folding. In other words, the absolute values of the row values are not equal. The misalignment is easily seen between rows 646 (+1.50) and 648 (−1.75). For row 646, the positive row +1.50 has a value of the $9^{th}$ & $8^{th}$ bits of the personality key (pKey[9:8]), but the negative row −1.50 has a value of 0b10. Likewise, for row 648, the positive row +1.75 has a value of the $7^{th}$ & $6^{th}$ bits of the personality key (pKey[7:6]), but the negative row −1.75 has a value of the $9^{th}$ & $8^{th}$ bits of the personality key (pKey[9:8]). Furthermore, in the illustrated embodiment, the +0.00 row 642 and the −5.50 row 644 have no equivalent counterpart. There is no −0.00 row nor a +5.50 row. In such an embodiment, extra logic must be employed to handle these corner-cases. This extra logic increases the size and complexity of the execution unit.

FIG. 6c is a block diagram of an example embodiment of a data structure or table 652 in accordance with the disclosed subject matter. In various embodiments, the table 652 may include an embodiment of a folded sparse LUT, as shown in FIG. 6a. In various embodiments, the folded sparse LUT 652 may be generated for each division or square root operation or instruction.

In the illustrated embodiment, the folded sparse LUT 652 may include non-negative (i.e. positive and zero values) and negative rows. In such an embodiment, an offset (e.g., 0.25, etc.) may be applied to shift the rows (e.g., the negative rows, etc.) such that they align and are symmetrical.

This symmetrical alignment can be seen in rows 666 and 668. For row 666, the positive row +1.50 has a value of the $9^{th}$ & $8^{th}$ bits of the personality key (pKey[9:8]), and likewise the shifted or offset negative row −1.750 has a value of the $9^{th}$ & $8^{th}$ bits of the personality key (pKey[9:8]). Likewise, for row 668, the positive row +1.75 has a value of the $7^{th}$ & $6^{th}$ bits of the personality key (pKey[7:6]), and the offset or shifted negative row −2.00 has a value of the $7^{th}$ & $6^{th}$ bits of the personality key (pKey[7:6]). Further, in this embodiment, the +0.00 row and the −5.50 row now have equivalent counterparts in the −0.25 row and the +5.25 rows, respectively. It is understood that the above are merely a few illustrative examples to which the disclosed subject matter is not limited.

Figure 7:
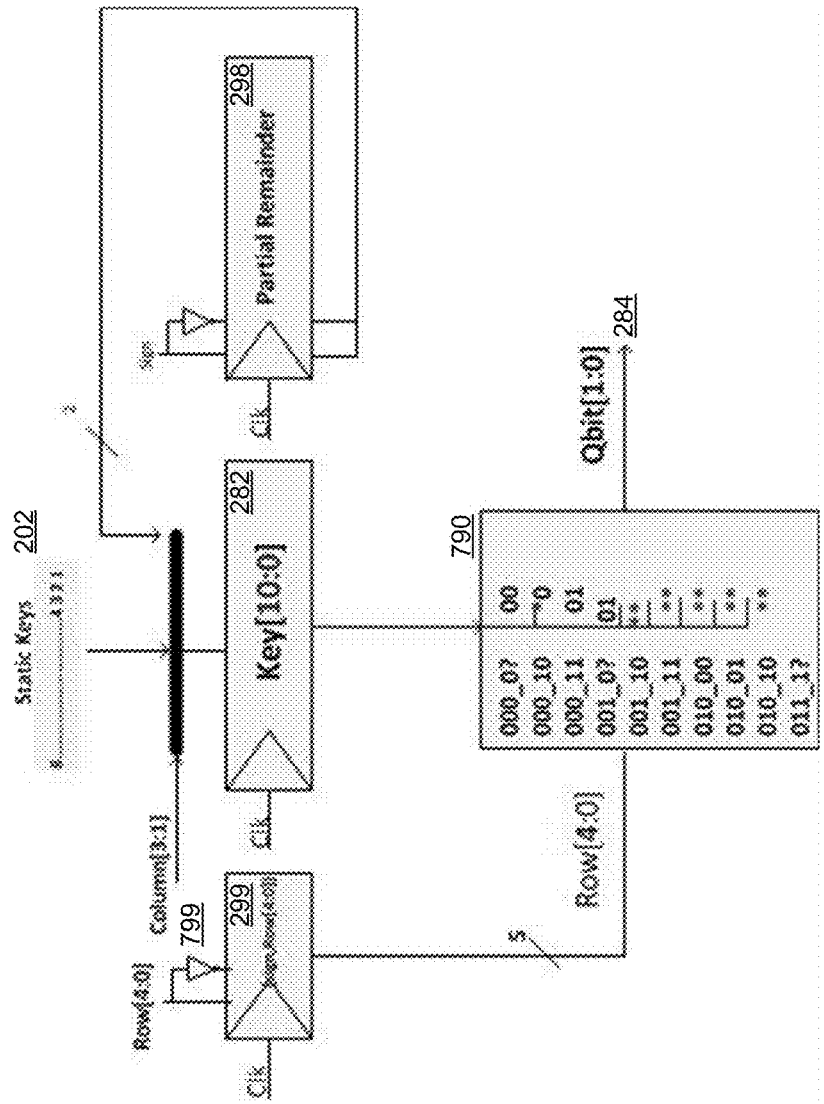
FIG. 7 is a block diagram of an example embodiment of a system in accordance with the disclosed subject matter.

FIG. 7 is a block diagram of an example embodiment of a system in accordance with the disclosed subject matter. In various embodiments, the system 700 may be a specific example of a partial embodiment of the system of FIG. 2. In the illustrated embodiment, an example of a folded sparse LUT 790 is shown.

In the illustrated embodiment, a 10 row folded sparse LUT 790 is shown. Also, the row indexes have been reduced from 6 bits to 5 bits. The MSB of the row index included a sign bit, and by folding the negative rows only to the non-negative rows there is no need (in the row index) for a sign bit. The sign bit may still be used to indicate that the row (or MSBs of the partial remainder) should be inverted, but once inverted (to non-negative values) the MSB of the row index may be ignored. This inversion (illustrated by inverter 799 next to the row flip-flop 299) may remove a multiplexing level from the critical path of the folded sparse LUT 790 processing logic. Thus the complexity of the logic to process the folded sparse LUT 790 may be reduced even further.

In the illustrated embodiment, the folded sparse LUT 790, for the illustrated column of 0000, may include the following rows and entries:

000.0?=0b00
000.10=key[10] concatenated with 0b0
000.11=0b01
001.0?=0b01
001.10=key[9:8]
001.11=key[7:6]
010.00=key[5:4]
010.01=key[3:2]
010.10=key[1:0]
011.1?=0b01

Therefore, the folded sparse LUT 790 may include 10 entries of 2 bits each, or 20 bits total. This may be a radical savings compared to the full 704 entry PD LUT. It is understood that the above is merely one illustrative example to which the disclosed subject matter is not limited.

In various embodiments, other columns or divisors may be used. Further, while the illustrated examples showcase the use of radix 4 embodiments, it is understood that the principles of a personality key, and a folded sparse LUT may be applied to other radix implementations. For example, benefits can be seen for higher radix division operations, such as radix 8, 16, or 32. Potentially very high radix operations (e.g., 64, 128, etc.) may be employed.

Figure 8:
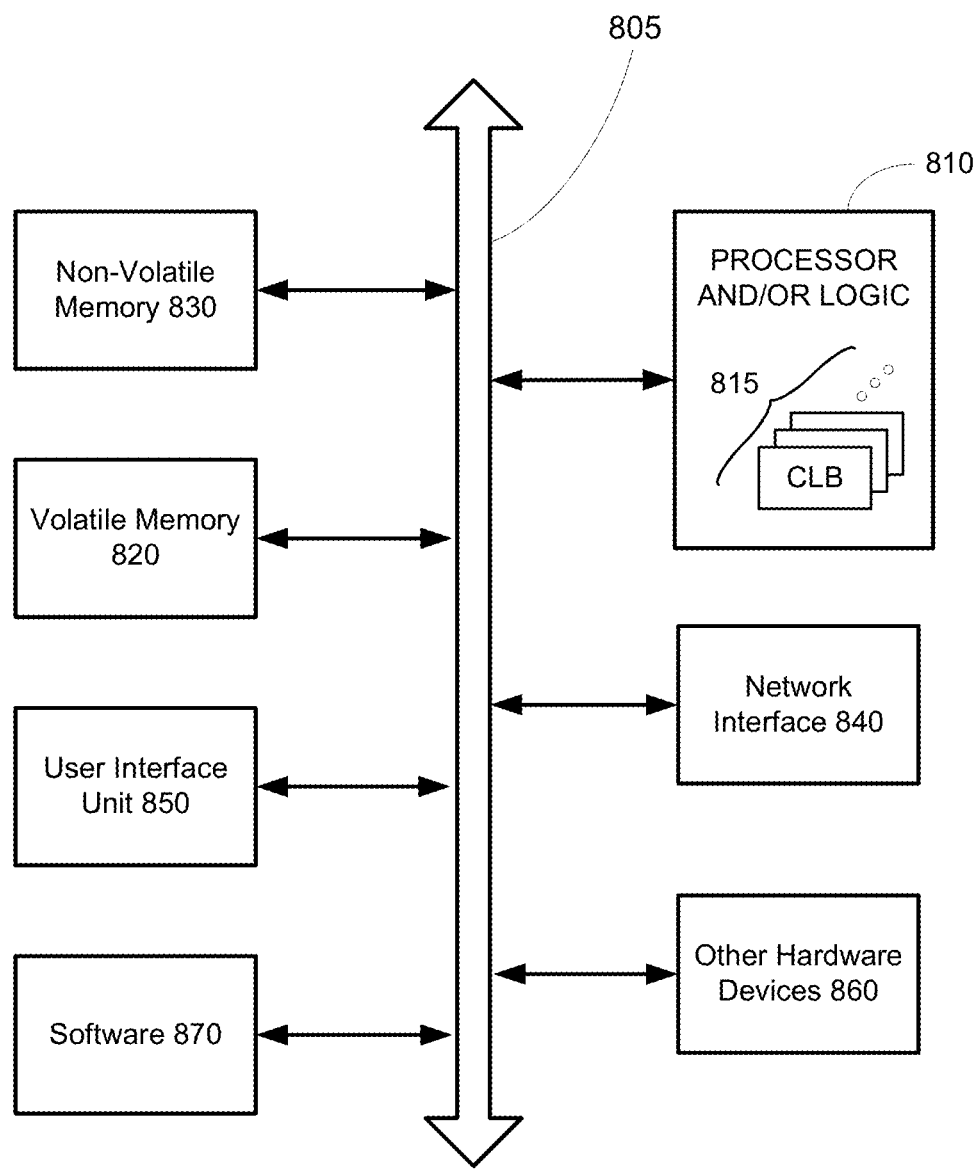
FIG. 8 is a schematic block diagram of an information processing system that may include devices formed according to principles of the disclosed subject matter.

FIG. 8 is a schematic block diagram of an information processing system 800, which may include semiconductor devices formed according to principles of the disclosed subject matter.

Referring to FIG. 8, an information processing system 800 may include one or more of devices constructed according to the principles of the disclosed subject matter. In another embodiment, the information processing system 800 may employ or execute one or more techniques according to the principles of the disclosed subject matter.

In various embodiments, the information processing system 800 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 800 may be used by a user (not shown).

The information processing system 800 according to the disclosed subject matter may further include a central processing unit (CPU), logic, or processor 810. In some embodiments, the processor 810 may include one or more functional unit blocks (FUBs) or combinational logic blocks (CLBs) 815. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 800 according to the disclosed subject matter may further include a volatile memory 820 (e.g., a Random Access Memory (RAM), etc.). The information processing system 800 according to the disclosed subject matter may further include a non-volatile memory 830 (e.g., a hard drive, an optical memory, a NAND or Flash memory, etc.). In some embodiments, either the volatile memory 820, the non-volatile memory 830, or a combination or portions thereof may be referred to as a "storage medium". In various embodiments, the volatile memory 820 and/or the non-volatile memory 830 may be configured to store data in a semi-permanent or substantially permanent form.

In various embodiments, the information processing system 800 may include one or more network interfaces 840 configured to allow the information processing system 800 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 800 according to the disclosed subject matter may further include a user interface unit 850 (e.g., a display adapter, a haptic interface, a human interface device, etc.). In various embodiments, this user interface unit 850 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 800 may include one or more other devices or hardware components 860 (e.g., a display or monitor, a keyboard, a mouse, a camera, a fingerprint reader, a video processor, etc.). It is understood that the above are merely a few illustrative examples to which the disclosed subject matter is not limited.

The information processing system 800 according to the disclosed subject matter may further include one or more system buses 805. In such an embodiment, the system bus 805 may be configured to communicatively couple the processor 810, the volatile memory 820, the non-volatile memory 830, the network interface 840, the user interface unit 850, and one or more hardware components 860. Data processed by the processor 810 or data inputted from outside of the non-volatile memory 830 may be stored in either the non-volatile memory 830 or the volatile memory 820.

In various embodiments, the information processing system 800 may include or execute one or more software components 870. In some embodiments, the software components 870 may include an operating system (OS) and/or an application. In some embodiments, the OS may be configured to provide one or more services to an application and manage or act as an intermediary between the application and the various hardware components (e.g., the processor 810, a network interface 840, etc.) of the information processing system 800. In such an embodiment, the information processing system 800 may include one or more native applications, which may be installed locally (e.g., within the non-volatile memory 830, etc.) and configured to be executed directly by the processor 810 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 810.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
   a key selector configured to select a personality key from at least a portion of an input value;
   a sparse look-up table generator configured to create a sparse look-up table by, at least in part:
   select, based upon at least a portion of the input value, a column of a partial-remainder look-up table;
   select, based upon a prior remainder, a row of the partial-remainder look-up table, wherein the partial-remainder look-up table includes a plurality of entries that include a portion of the personality key,
   collapse rows having common entries,
   shift negative rows by a predefined amount, and
   fold non-negative rows and negative rows to form a folded sparse look-up table;
   the sparse look-up table that is folded and configured to determine a portion of a result based upon the personality key and a prior remainder;
   an adder configured to compute a current remainder based upon, at least, the input value, and the portion of the result; and
   wherein the apparatus is configured to iteratively compute current remainders and portions of the result until either the current remainder is zero, or a predefined level of precision is reached.

2. The apparatus of claim 1, wherein the adder includes a full adder.

3. The apparatus of claim 1, wherein, for a radix of 4, the sparse look-up table comprises 20 bits.

4. The apparatus of claim 1, wherein the personality key remains static between iterations.

5. The apparatus of claim 1, wherein a radix of the sparse look-up table is selected from a group consisting of: 2, 4, 8, 16, 32, 64, and 128.

6. The apparatus of claim 1, wherein if the apparatus is configured to compute a division operation, the input value is a divisor and the result is a quotient; and if the apparatus is configured to compute a square root operation; and the input value is a radicand and the result is a root.

7. The apparatus of claim 1, wherein the sparse look-up table comprises an inverter to invert the prior remainder if the prior remainder is negative.

8. A system-on-a-chip (SoC) comprising:
   an instruction circuit configured to issue an instruction to an arithmetic circuit, wherein the instruction is associated with an input value;
   the arithmetic circuit comprising:
   a key selector configured to select a personality key from at least a portion of the input value,
   a sparse look-up table generator is configured to create a sparse look-up table from a partial-remainder lookup table by:
   select, based upon at least a portion of the input value, a column of a partial-remainder look-up table, wherein the partial-remainder look-up table includes a plurality of entries that include a portion of the personality key,
   select, based upon a prior remainder, a row of the partial-remainder look-up table,
   collapse rows having common entries,
   shift a center line by a predefined amount, and
   fold non-negative rows and negative rows to form a folded sparse look-up table;
   a sparse look-up table that is folded, and configured to determine a portion of a result based upon the personality key and a prior remainder,
   an adder configured to compute a current remainder based upon the input value, and the portion of the result, and
   wherein the arithmetic circuit is configured to iteratively compute current remainders and portions of the result until either the current remainder is zero, or a predefined level of precision is reached; and
   a memory configured to store the result.

9. The system-on-a-chip of claim 8, wherein the instruction is either a division instruction or a square root instruction.

* * * * *